United States Patent
Ellis

[11] 3,947,061
[45] Mar. 30, 1976

[54] EXTENSIBLE VEHICLE BUMPER

[76] Inventor: Eugene Ellis, 202 Coast Blvd., La Jolla, Calif. 92037

[22] Filed: Feb. 28, 1975

[21] Appl. No.: 554,180

[52] U.S. Cl. .................................. 293/5; 293/73
[51] Int. Cl.² ...................................... B60R 19/02
[58] Field of Search ............... 293/1, 5, 24–26, 293/63, 73, 85, DIG. 2; 180/82 R, 91, 92, 103, 105 R, 108, 93–97

[56] References Cited
UNITED STATES PATENTS

| | | | |
|---|---|---|---|
| 1,593,866 | 7/1926 | Christinzio | 293/73 |
| 2,628,118 | 2/1953 | Gunnels, Jr. | 293/73 |
| 2,873,994 | 2/1959 | Omps | 293/73 X |
| 2,977,146 | 3/1961 | Edwards et al. | 293/1 X |
| 3,134,619 | 5/1964 | Harrison, Jr. | 293/73 X |
| 3,677,595 | 7/1972 | Hamilton | 293/73 |
| 3,834,483 | 9/1974 | Palmer | 180/91 |

Primary Examiner—John J. Love
Assistant Examiner—Andres Kashinikow
Attorney, Agent, or Firm—Ralph S. Branscomb

[57] ABSTRACT

A bumper for motor vehicles which is operated by hydraulic slave cylinders connected to the master brake cylinder to extend the bumper upon the application of a predetermined amount of force to the brake to provide the bumper with a greater shock absorbing length of travel under collision conditions while permitting the retraction of the bumper to facilitate in-town maneuvering and parking under normal driving conditions.

4 Claims, 3 Drawing Figures

EXTENSIBLE VEHICLE BUMPER

BACKGROUND OF THE INVENTION

The invention relates to extensible bumpers for automobiles and other motor vehicles, these bumpers being designed to extend upon the vehicle approaching a collision situation to provide a greater cushioning effect upon impact due to the greater length of bumper travel available.

The recent increase in interest in safety for vehicle passengers and in the reduction of the high repair costs arising from the involvement of vehicles of current design in minor accidents has led to the development of numerous bumpers of widely different designs, and including bumpers which extend in one way or another prior to impact. Of the latter, there are bumpers having extension mechanisms which are triggered by the application of the vehicle brakes, but depend on a source of power to effect the extension which is independant of the brake system, with the effect of unnecessarily complicating the apparatus.

SUMMARY OF THE INVENTION

The bumper of the present design is very simple in concept and utilizes only the brake fluid and the braking action itself to effect the extension of the bumper. This is accomplished by a pair of hydraulic slave cylinders which are pivoted between the vehicle frame and the bumper bar, the primary support for the bumper bar being provided by sliding guide rods to relieve the cylinders of lateral stresses occuring during a collision. The slave cylinders communicate by intake and discharge lines directing to the master brake cylinder and fluid reservoir, respectively, these lines being provided with check valves to ensure proper flow direction, and the intake check valve also being a pressure valve so that the slave cylinders are activated only upon the application of a predetermined minimum force on the brake pedal to prevent projection of the bumper under normal driving conditions. The bumper bar is spring loaded to retract susbsequent to their extension during, or in anticipation of, a collision.

DETAILED DESCRIPTION OF THE PREFERRED EMBODIMENT

Figure 1:
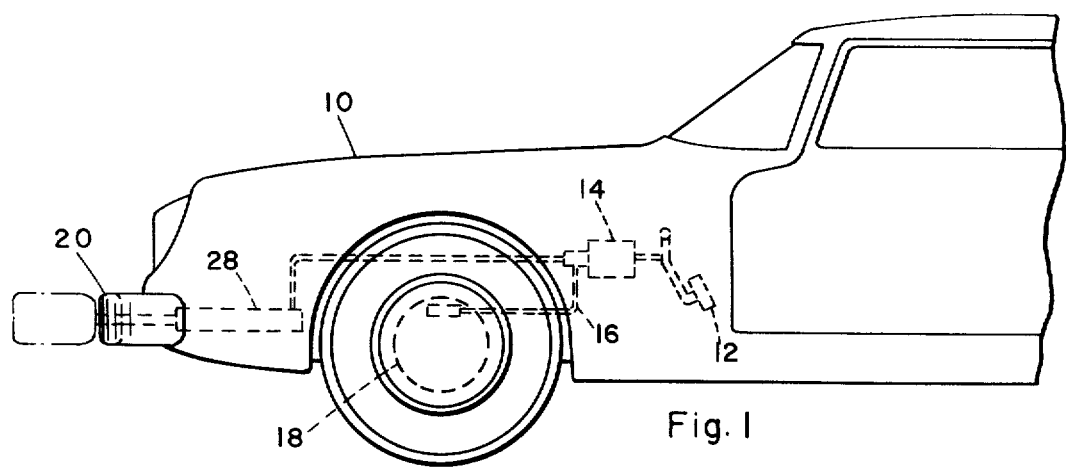
FIG. 1 is a side elevation view of the bumper system installed in a typical vehicle.

The front end of an automobile is illustrated diagrammatically at 10 in FIG. 1, having a conventional brake pedal 12 which operates the master cylinder 14 of the car's hydraulic brake system, which includes brake lines 16 and the brakes themselves, 18. As will become apparent, the extensible bumper of the invention would function equally well on a vehicle having air brakes, with some modification, although only a hydraulic system is described herein.

A bumper bar 20, which may be conventional but is preferably more durable and damage-resistant than bumpers currently in use, is mounted on frame members 22 of the automobile by any means that will permit forward and reverse sliding motion between the bumper bar and frame, such as the bars 24 which are slideably received in the elongated sockets 26 which are welded or otherwise attached to the frame members.

The bumper extension assembly includes a pair of hydraulic-slave cylinders 28 which are pivoted at 30 to a pair of mounting brackets 32 welded to the inner sides of the frame members 22. A pair of pistons 34 are slideable within the cylinders and are sealed with suitable rings 36 so that a sealed, expandable chamber 38 is defined in the end of each of the cylinders. Connecting rods 40 extend through bushings 42 in the opposite ends of the cylinders and are pivoted to the bumper bar by pins 44 anchored in brackets 46 welded to the bumper bar. Thus the cylinder and piston assemblies can withstand considerable lateral swaying motion on their pivot structures without suffering damage, although the guide structures 24–26 should minimize such motion.

Figure 2:
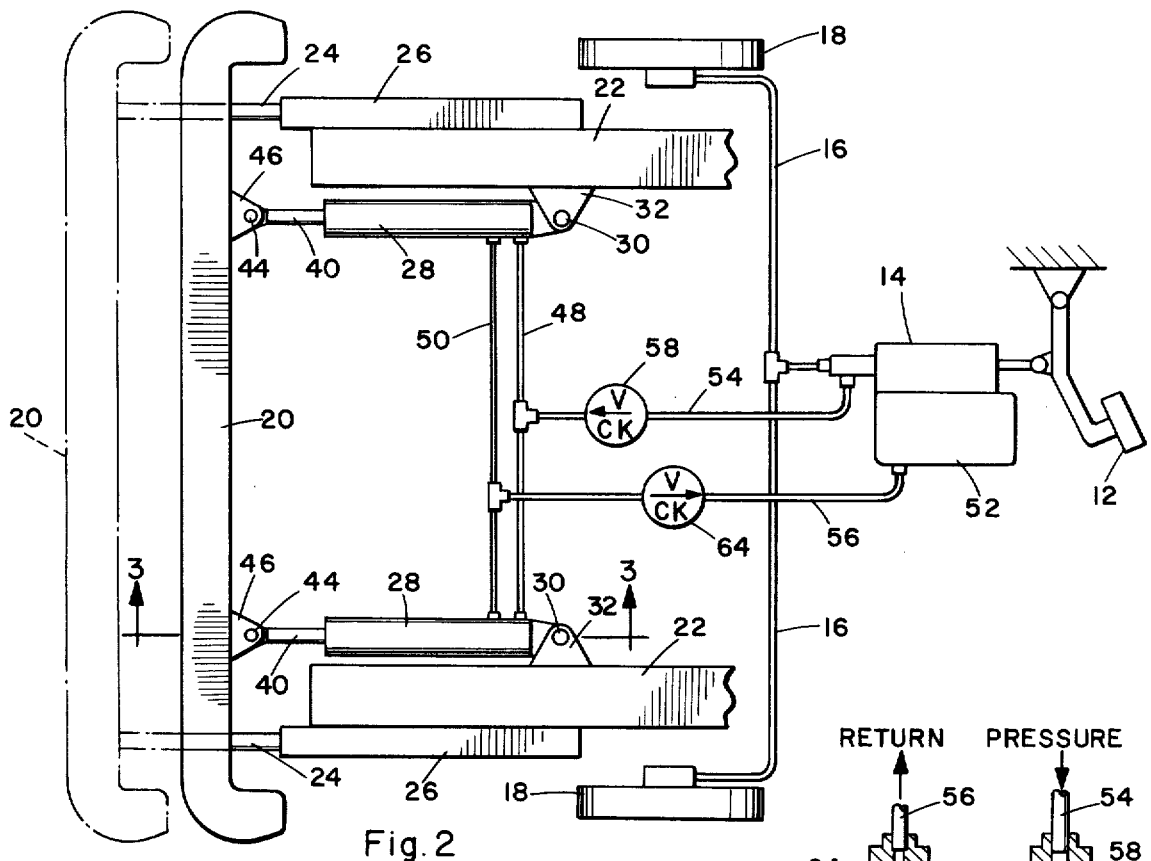
FIG. 2 is a top plan view of the bumper installation, with the actuating system shown diagrammatically.
Figure 3:
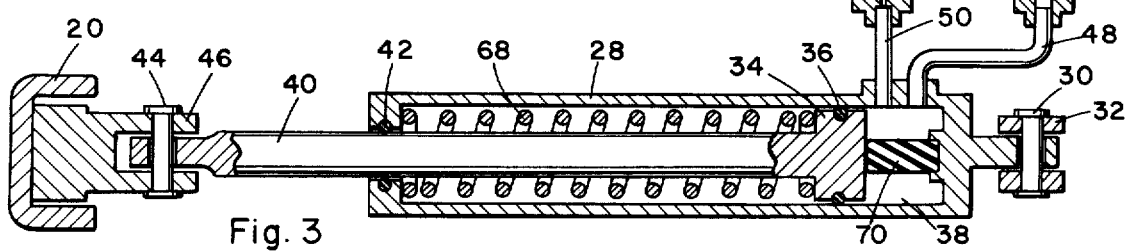
FIG. 3 is an enlarged sectional view taken on line 3—3 of FIG. 2, showing one actuating cylinder and the associated valves.

The chambers 38 are connected by a fluid intake line 48 and a drain or discharge line 50, these lines being connected to the master brake cylinder 14 and a reservoir 52, respectively, by lines 54 and 56. The brake cylinder line 54 is provided with a check valve 58 which is schematically shown in FIG. 2 and shown diagrammatically in a variant location in FIG. 3, wherein the valve is shown to communicate individually with one cylinder. In either case, the valve prevents backflow of fluid into the brake cylinder and is constructed with a ball 60 biased into seating position in the valve by a spring 62, this spring being of a predetermined strength to prevent the opening of the valve until a threshold pressure is developed in the line 54 so that unless the brakes are applied with a certain minimum force, the valve will not open and no fluid will enter the chambers 38.

In operation, when the brakes are applied with enough force to open the valve 58, brake fluid flows freely into the chambers 38, thereby projecting the bumper into its extended position shown in phantom in FIG. 2. The strength of the spring 62 is sufficient to ensure that the high pressure needed in the fluid at the brakes 18 is not dissipated by fluid flow into the slave cylinders of the bumper. The pistons are projected against the bias of return springs 68, and there will of course be some insignificant bleeding of the brake fluid into the reservoir lines through the duct 66 in the valve 64.

Once the bumper bar is extended, if there is no collision it will slowly retract under the action of the return springs 62 until the pistons come to rest against resilient bumper elements 70 which are disposed in the pressure chambers 38 to prevent the chambers from being completely closed by the pistons. If there is an impact on the bumper bar, a high pressure will be developed in the chambers 38 which will be relieved by fluid flow through the duct 66 so that the bumper will yield, thereby limiting the otherwise rapid decelleration of the vehicle which causes personal injury to passengers and structural damage.

An identical bumper assembly could of course be provided at the rear of the car, and a somewhat more sophisticated means of controlling the discharge of fluid from the cylinders under impact conditions could be developed within the scope of the invention disclosed and claimed herein.

I claim:

1. An extensible bumper for use on a vehicle having a fluid-operated brake system comprising:

a. a bumper bar;

b. a pair of fluid-operated slave cylinders mounted to a vehicle frame and having the pistons thereof connected to said bumper bar to extend same upon said cylinder being activated;

c. said cylinders having fluid connection means to the fluid system of the vehicle brake system, said fluid connection means including a valve means to permit fluid flow into said cylinders upon the existence of a predetermined threshold pressure in said fluid system, whereby upon application of a predetermined force to the vehicle brakes said bumper bar is extended.

2. Structure according to claim 1 wherein said brake system is hydraulic and includes a master cylinder and a fluid reservoir, and said fluid connection means includes an incoming fluid line connecting said master cylinder and said slave cylinders, and a drain line connecting said cylinders and said reservoir.

3. Structure according to claim 1 wherein each of said cylinders is provided with a resilient bumper element inside the end thereof remote from said bumper bar to limit the travel of the piston therein and preserve a fluid chamber.

4. Structure according to claim 1 wherein said pistons are pivotally connected to said bumper bar, said cylinders are pivotally connected to said frame, and including guide means connected to and between said frame and said bumper bar to limit the relative motion therebetween to unidirectional translation.

* * * * *